United States Patent
Lazaris-Brunner et al.

[11] Patent Number: 5,956,620
[45] Date of Patent: Sep. 21, 1999

[54] ANALOG PROCESSOR FOR DIGITAL SATELLITES

[75] Inventors: Ken Lazaris-Brunner, Burlington; Gary Beauchamp, Cambridge; Bharat Tailor, Kitchener, all of Canada

[73] Assignee: COM DEV Limited, Cambridge, Canada

[21] Appl. No.: 08/784,839

[22] Filed: Jan. 17, 1997

[51] Int. Cl.[6] ................................. H04B 7/185

[52] U.S. Cl. ................ 455/12.1; 455/22; 455/266; 455/275; 455/428; 370/316

[58] Field of Search ................ 455/8, 12.1, 13.1, 455/11.1, 7, 13.3, 20–22, 189.1, 254, 266, 275, 285, 286, 303, 306, 315, 427, 428; 370/316, 323, 325, 319

[56] References Cited

U.S. PATENT DOCUMENTS

| | | |
|---|---|---|
| 4,105,973 | 8/1978 | Arnold et al. . |
| 4,144,495 | 3/1979 | Metzger . |
| 4,228,401 | 10/1980 | Wachs et al. . |
| 4,456,988 | 6/1984 | Nakagome et al. . |
| 4,491,947 | 1/1985 | Frank . |
| 4,509,198 | 4/1985 | Nagatomi . |
| 4,722,083 | 1/1988 | Tirro et al. . |
| 4,858,225 | 8/1989 | deSantis . |
| 4,931,802 | 6/1990 | Assal et al. .............................. 455/12.1 |
| 5,152,482 | 10/1992 | Perkins et al. . |
| 5,208,829 | 5/1993 | Soleimani et al. . |
| 5,247,627 | 9/1993 | De Santis . |
| 5,404,375 | 4/1995 | Kroeger et al. . |
| 5,428,814 | 6/1995 | Mort et al. . |
| 5,506,904 | 4/1996 | Sheldrick et al. . |
| 5,563,892 | 10/1996 | Kostreski et al. . |
| 5,613,197 | 3/1997 | Copeland et al. ..................... 455/12.1 |
| 5,745,846 | 4/1998 | Myer et al. .............................. 455/303 |
| 5,790,529 | 8/1998 | Haber ..................................... 370/323 |

*Primary Examiner*—Nguyen Vo
*Assistant Examiner*—Lester G. Kincaid
*Attorney, Agent, or Firm*—Jones, Day, Reavis & Pogue

[57] ABSTRACT

An analog processor for use with digital satellites. The analog processor is connected between the receiving circuitry of the satellite and a pool of digital on-board processors, and segments the bandwidth of uplink RF beams into sub-bands that can be processed more readily with standard, low-risk, low-power digital processors. Using the present invention, the risk of employing a particular digital processor technology can be managed and optimized. The present invention also provides for the dynamic allocation and reallocation of the available on-board digital processing bandwidth based on the anticipated traffic pattern and changes in the traffic pattern. In addition, the present invention facilitates the use of standard and non-standard redundancy schemes at minimal hardware expense.

29 Claims, 3 Drawing Sheets

ANALOG PROCESSOR FOR DIGITAL SATELLITES

BACKGROUND OF THE INVENTION

The present invention is directed toward the field of multi-beam communication satellites that incorporate on-board digital processors. In particular, an analog pre-processor is disclosed for use with such digital satellites. The analog pre-processor is connected between the satellite's receive circuitry and the on-board digital processor(s) in order to optimize the processing capability of the satellite, and to provide the ability to manage the risk of selecting a particular digital processor technology.

Communication satellites generally consist of a payload and a bus. The bus includes the satellite structure (or platform), electrical power system, thermal control system, propulsion system, and orbit control system. The payload, which is the communications part of the satellite, generally includes the antenna (receive and transmit) subsystem, the repeater, and a telemetry, tracking and command module. The present invention relates to improvements in the communications satellite payload, in particular the repeater section of a digital satellite.

A transparent repeater, also known as a "bent pipe" repeater, performs filtering, frequency and power conversion, and switching between beams without altering the baseband signal in any manner. For large bandwidth carriers (i.e. commercial communications satellites), this filtering and switching is performed by analog means. For smaller bandwidth carriers it is possible to perform some of the repeater functions digitally, such as the filtering and switching steps.

As distinguished from the transparent repeater, a regenerative repeater processes the baseband signal content of the RF uplink signal such that the individual carrier signals of an uplink beam are demodulated (i.e. the information bits of the signal are recovered). A regenerative repeater can also switch the demodulated data to an arbitrary output beam and time multiplex (as in a TDM system) the switched signals from all beams on to one or a few downlink carriers using an optimized remodulation and/or multiple access scheme, thus resulting in a more efficient system. Transparent repeaters are generally (but not always) analog systems, whereas regenerative repeaters generally employ on-board digital processors. For a basic discussion of communication satellite design considerations see M. Richharia, *Satellite Communication Systems—Design Principles,* McGraw-Hill, 1995.

Recently proposed commercial satellite systems for use in the Ka-band spectrum (20/30 GHz) include multi-beam architectures with as many as 192 beams and on-board digital processing technology. The amount of frequency spectrum (i.e. bandwidth) in each uplink beam to be digitized and processed by the on-board digital processor(s) is typically in the range of 125 MHz, but could be much larger. The resultant bandwidth that must be processed digitally on such satellites presents a serious design problem.

There is a need to design an architecture that can handle this bandwidth, while minimizing the risk, power, and size of the satellite repeater, and hence the overall satellite architecture. The risk associated with selecting a particular digital processor is determined by the bandwidth to be processed. For example, a lower power processor capable of processing 25 MHz of bandwidth that incorporates standard space-qualified hardware is much less risky to employ than a higher power 200 MHz processor that may include components and elements that have not been previously proven in space.

Figure 1:
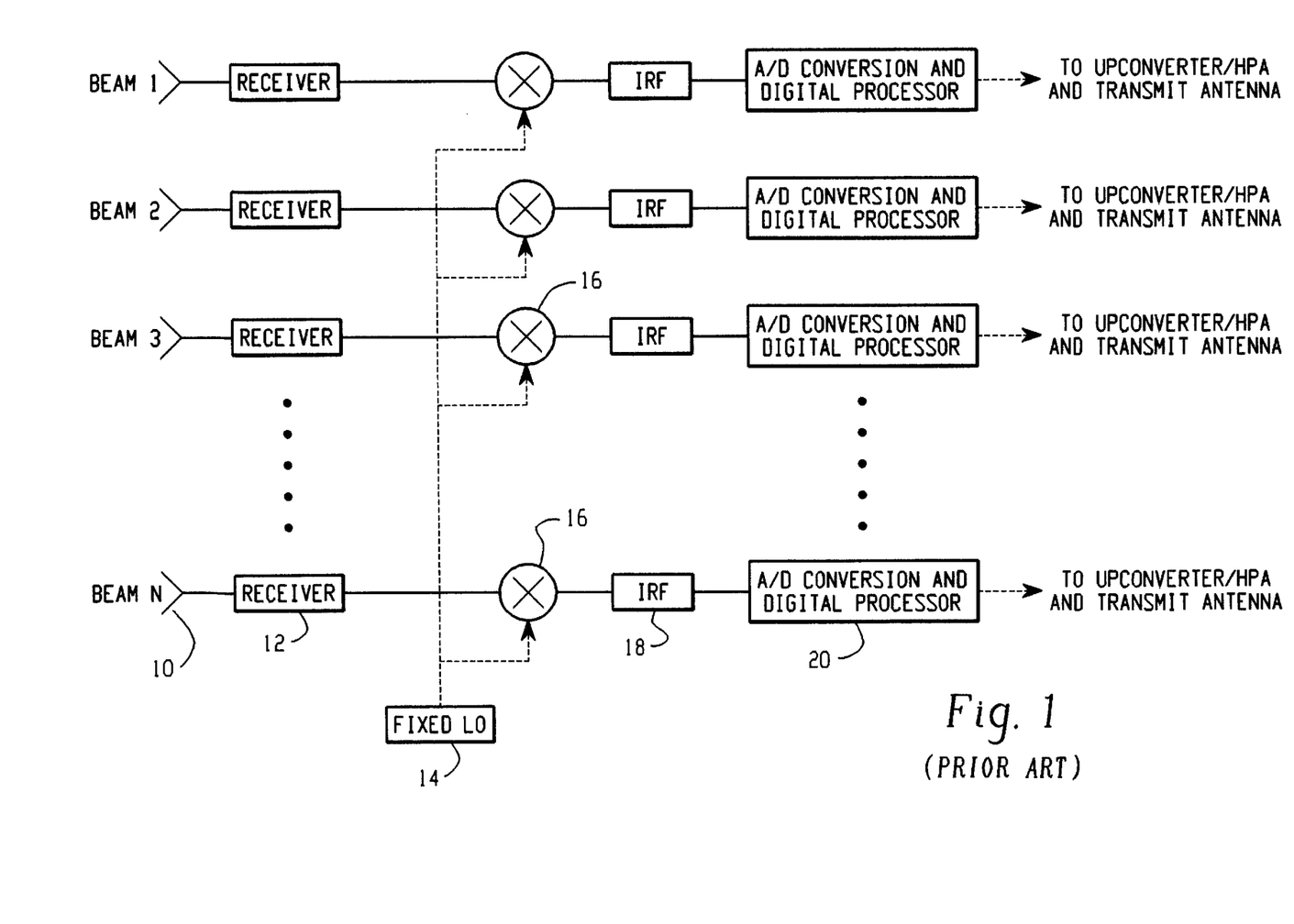
FIG. 1 is a block diagram of a conventional one-to-one digital satellite repeater.

In FIG. 1, a prior art digital satellite repeater is shown, having one-to-one correspondence between uplink beams and digital processors. In this figure, each uplink beam (1-N) is shown connected to an individual receive element 10 of an antenna. As described below in the detailed description, multiple uplink beams could be connected to each receive element 10 in a process known as beamforming.

A receiver 12 is connected to the receive element 10 and receives signals covering a certain bandwidth of a given beam from an associated antenna by filtering the desired bandwidth to remove unwanted out-of-band signals and noise, and downconverting to a common intermediate frequency for all beams. This entire bandwidth is routed to mixer 16, where the received RF signal is downconverted to a baseband signal by mixing with a fixed signal from a local oscillator 14. The baseband signal is filtered by an Image Rejection Filter (IRF) 18, which is a low pass filter that eliminates the higher frequency image that is a byproduct of the frequency downconversion process. All of the carrier signals that comprise the beam are routed to one of N digital processors 20 which perform analog to digital conversion and other digital processing, such as demodulation, switching, etc.

The well-known elements of the repeater that are used to transmit downlink beams back to the earth, or to another satellite in the case of an inter-satellite link, are not shown in FIG. 1 (or the rest of the figures in this application) for clarity. These elements include remodulation or digital remultiplexing circuitry, upconversion mixers for converting the processed baseband signals to an appropriate downlink frequency, high power amplifiers (HPA) for boosting the power of the upconverted signal, multiplexing where required, and the multiple spot-beam transmit antennas. Also not explicitly shown is the digital switch that is generally connected between the outputs of the digital processors and the downlink circuitry.

In the one-to-one system of FIG. 1, N digital processors are required. Each digital processor must be capable of handling the full-bandwidth (up to 125 MHz in the recently proposed systems) of an incoming uplink beam in order to provide flexibility for changing traffic patterns. Presently available space-qualified low-power digital technology cannot handle this bandwidth.

In reality, many of the uplink beams will have unoccupied spectrum and hence be underutilized, although some of the beams may be fully utilized. For example, an uplink beam from a heavily populated urban area may be fully utilized, some or all of the time, whereas a beam emanating from a rural area may only be partially used. The solution of FIG. 1 is inflexible and wastes a tremendous amount of processing power since there is no mechanism for allowing underutilized digital processors to assist with the processing of beams that contain a larger bandwidth of information. This system thus suffers from poor digital processor utilization, and requires the use of high-risk, non-proven digital processor technology.

Therefore, there remains a general need in the art of communication satellites for a digital satellite repeater that optimally uses available digital processing power. Moreover, there remains a need for such a digital satellite repeater that can be reconfigured in response to changes in the traffic pattern utilization of the satellite. In addition, there remains a need for such a digital satellite repeater that uses low-power, space-qualified processor technology.

More specifically, there remains a need for a digital satellite repeater that includes an analog pre-processor for switching, extracting and routing sub-bands of incoming uplink beams in order to optimize available on-board digital processing capabilities. There remains a further need for such an analog pre-processor that has the capability to adapt to changes in the traffic pattern by changing the way it switches and routes incoming beams, and by changing the portion (sub-band) of the incoming beam bandwidth that is extracted.

Yet another unfulfilled need in this art is for a digital satellite repeater that has an architecture which can provide for implementation of any kind of redundancy scheme, at minimal hardware cost. Such a repeater could easily accommodate standard 2:1 or 3:2 types of redundancy, as well as unconventional schemes such as 10:8 or 12:8. These unconventional schemes, such as 12:8, have higher reliability than, for example, four 3:2 conventional redundancy blocks, even though the amount of hardware is the same.

SUMMARY OF THE INVENTION

The present invention overcomes the problems noted above and satisfies the needs in this field for a digital satellite repeater that incorporates an analog pre-processor for switching, extracting and routing sub-bands from a plurality of incoming beams to a plurality of digital baseband processors.

The present invention provides an analog processor for use with digital satellite repeaters. The analog processor is connected between the receiving circuitry of the satellite and the on-board digital processors, and includes a switching matrix and a plurality of sub-band downconversion processing chains. Each sub-band processing chain includes a programmable frequency translator and bandpass filter which, in combination, extract or segment a portion of the total bandwidth of an incoming beam into sub-bands that may have differing bandwidths, and which route the sub-bands to a digital processor where the analog signal is converted to digital and processed.

The analog processor enables the digital processing power of the satellite to be optimized to the incoming traffic pattern of the uplink beams. If a certain beam is underutilized, then only spectral segments containing signals are extracted and routed for digital processing. The unused portion of the incoming beam is not processed.

Some of the sub-band segments may only be partially occupied if the bandpass filter bandwidths do not fit evenly into the utilized spectrum (e.g. in a 125 MHz beam, if 40 MHz is occupied and the sub-band processing chains have 25 MHz bandpass filters, then 2 sub-band processing chains are required for the beam, resulting in a full 25 MHz segment from one filter and a partially occupied 15 MHz segment from the second filter). Although in this case there is 10 MHz of wasted digital processing power (assuming 25 MHz digital processors), the design tradeoff is between optimum digital processing and extra filters required for increased bandwidth granularity (i.e. more filters with smaller bandwidths).

Instead of a one-to-one correspondence between beams and processors, the analog processor provides for a programmable one-to-K correspondence, where K could be one for underutilized beams, but in general will be greater than one for partially or fully utilized uplink beams. For example, if a given uplink beam is fully utilized at 125 MHz, and the satellite includes a plurality of 25 MHz digital processors, then the analog processor is programmed to switch the uplink beam to 5 sub-band processing chains, and segments and routes the five 25 MHz sub-bands for digital processing.

If the traffic pattern on this beam is then changed for some reason such that only 75 MHz of information was being transmitted, the analog processor could be reprogrammed to switch the beam to only 3 sub-band processing chains. In this manner, the present invention is adaptable to changing traffic patterns, thus providing for continued optimization of the on-board digital processing power over the life of the satellite. This is a major advantage of the present invention over conventional digital processing repeaters.

Using the analog pre-processor of the present invention, a "pool" of digital processors can be shared among multiple uplink beams, shifting the processing power among the beams as required by shifting beam utilization or traffic patterns. An additional advantage of the disclosed architecture is that any type of redundancy scheme can be implemented by simply adding downconversion or sub-band processing chains and reprogramming the included switching matrix to route the incoming beam to the appropriate redundant chain(s). The analog processor also enables the use of lower-power, proven digital processing technology.

As will be appreciated, the invention is capable of other and different embodiments, and its several details are capable of modifications in various respect, all without departing from the invention. Accordingly, the drawings and description of the preferred embodiments are to be regarded as illustrative in nature and not restrictive.

BRIEF DESCRIPTION OF THE DRAWINGS

The above advantages will become apparent from the following description when read in conjunction with the accompanying drawings wherein.

DETAILED DESCRIPTION OF THE PREFERRED EMBODIMENTS

Figure 2:
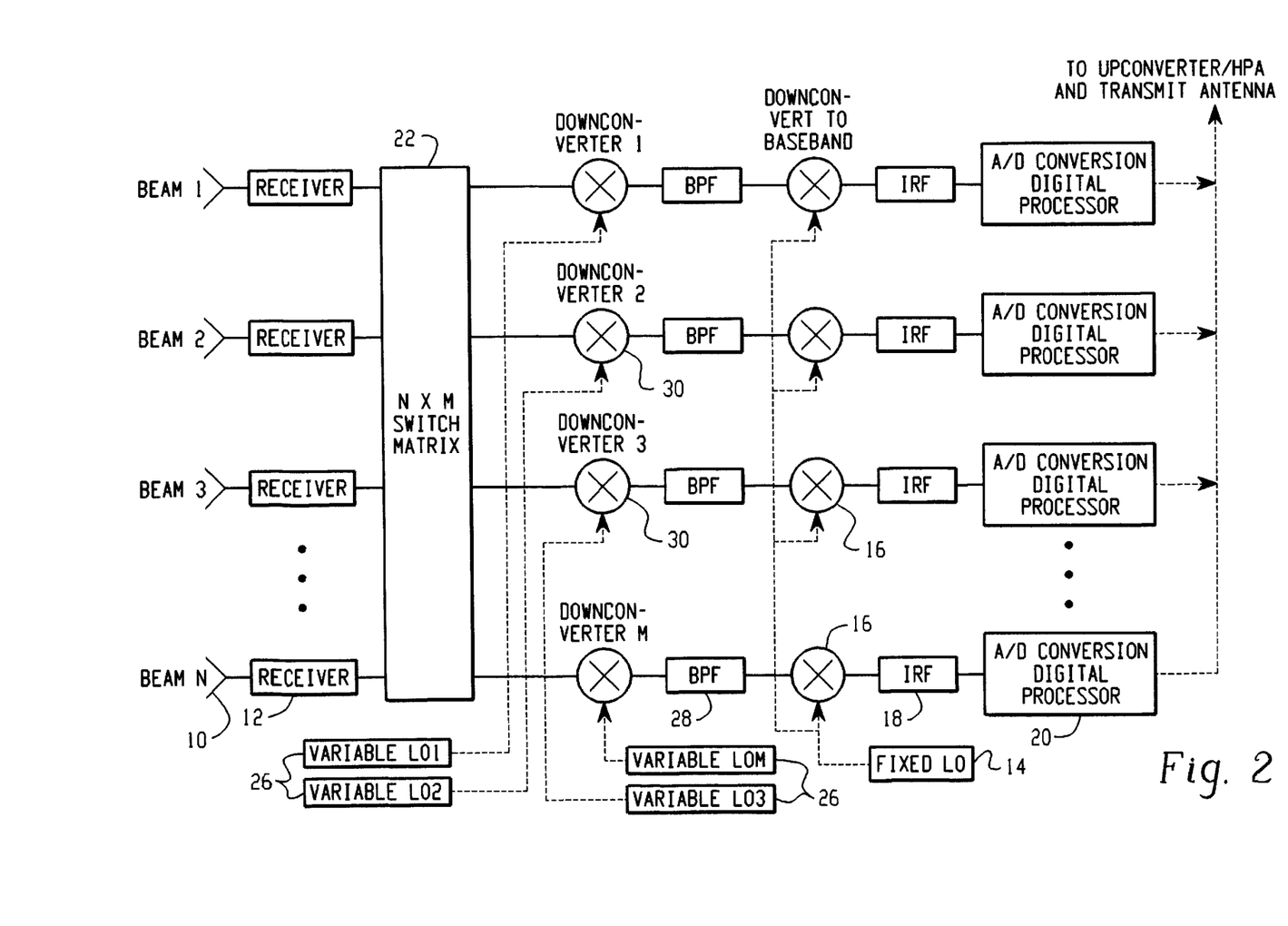
FIG. 2 is a block diagram of a digital satellite repeater incorporating an analog pre-processor according to the present invention.

Referring now to the drawings, FIG. 2 sets forth a block diagram of an analog pre-processor according to the present invention incorporated into a digital satellite repeater. As with the prior art FIG. 1, the downlink circuitry of the present invention, including remodulation, upconversion, high power amplification (HPA), and the multi-beam transmit antennas are omitted from the drawings for clarification. In addition, the digital switch that is generally connected between the digital processors 20 and the downlink circuitry is not shown. These elements are well known in the art of satellite repeaters and will not be discussed in detail, other than to note their presence in the end-to-end repeater design.

FIG. 2 includes some of the same elements as the prior art one-to-one digital regenerative repeater, including at least one antenna having a plurality receive elements 10 for receiving beams of information, labelled Beam 1 to Beam N. For illustration purposes only, FIG. 2 shows all N incoming uplink beams being routed through a single analog pre-processor. These N beams form a "group" of beams. A group may consist of anywhere from one to all of the beams of a particular multibeam configuration. Alternatively, and depending upon the number of beams in the satellite system, several groups of beams could be formed, and in this case each group of beams would have an associated analog pre-processor for the group. Thus the present invention envisions the use of multiple analog pre-processors, with a group of beams assigned to each analog processor. Grouping of beams in this manner for switching significantly reduces the size of the switching matrix 22, although at the expense of interbeam connectivity and flexibility.

In addition, FIG. 2 shows a single receive element 10 and uplink beam per receiver 12, although, alternatively, a beam can be formed from a combination of receive elements 10 from a given antenna. This is done using multiple receive elements, the angular offset of the particular elements setting the direction of the beam. The multiple receive elements 10 of the given antenna are then connected to the inputs of a beamformer to form a composite signal. A beamformer is a device which modifies the characteristics of the signals from the receiver elements, in some fashion, in order to provide a composite signal with more desirable characteristics. In order to improve performance, a vector product of adjacent beams is performed in the beamformer to obtain characteristics such as lower sidelobes or wider coverage area. This technique is known as beamforming. Although not explicitly set forth in FIG. 2 (since FIG. 2 shows a one-to-one correspondence between receive elements 10 and receivers 12), in a digital satellite with beamforming, the beamformer is preferably positioned between several of the receive elements 10 and a receiver 12.

Alternatively, beams may be formed by a phased array antenna. Here, the antenna has a set of discrete receive or transmit elements on a fixed grid, which is generally rectangular or hexagonal. The beams are pointed or directed by phase shifting the outputs of each individual element appropriately so that only signals received from the desired direction add coherently. This is done by performing a complex vector dot product, either analog or digital, between the received signals and the desired direction vector to form a set of beamformer outputs. This is also known as beamforming.

Regardless of the method of forming the received beams of information at 10, the signals are then routed to receivers 12. Each receiver 12 generally consists of low noise amplification (LNA) stages, followed by a downconversion stage to a frequency that is compatible with the N×M Switching Matrix 22. Alternatively, instead of positioning the beamformer between the receive elements 10 of the antenna and the receiver 12, the beamforming can be performed after the LNAs and before the downconverters of the receiver circuits 12, or could be done after both the LNAs and downconverters.

The RF signal in each uplink beam consists of a number of "carriers". Optimally, the carriers in each beam are contiguous in order to minimize the number of sub-band processing chains required. The signals from the N receiver circuits 12 are routed to the inputs of an N×M switching matrix 22, which preferably has a cross-bar switch architecture implemented with microwave switches, but could alternatively be any other type of switching matrix architecture, and could be implemented with other switching technologies, such as a solid-state GaAs switches, or waveguide switches.

In the N×M switch matrix 22, any input can be routed to any of the M outputs, but each of the M outputs can only be connected to one input. The switch matrix 22 is configured, and can be reconfigured, to route the incoming beams to the required number of sub-band processing chains 28, 30 depending on the number of carriers (i.e. the bandwidth) of the incoming uplink signal to be processed.

Each sub-band processing chain consists of a downconverter or mixer 30, a variable local oscillator (VLO) 26, and a band pass filter (BPF) 28. The mixer 30 takes as inputs one of the uplink beams from the N×M switch and a selectable frequency translation signal from a variable local oscillator 26. The frequency translation signal from the VLO 26 is preferably generated by the analog pre-processor, but could be from an external source, or could be selected from a set of fixed local oscillators, supplied either internally or externally to the analog pre-processor.

The sub-band processing chains extract or segment a portion of the incoming RF uplink spectrum. In order to accomplish this functional result, the frequency translation signal from the VLO 26 must be selectable or programmable over the bandwidth of the incoming RF signals. The frequency of the VLO 26 is selected in order to bring the desired carriers (sub-band) into the passband of the subsequent bandpass filters 28. This method permits the same type of filters 28, with the same center frequency and bandwidth response, to be used for all of the BPF's. This is not a requirement of the present invention however, as any type of BPF can be used, including filters having different center frequencies and bandwidths. For example, several smaller bandwidth chains may be included to handle known low utilization beams with higher bandwidth chains for projected high utilization beams.

The bandpass filters 28 are preferably surface-acoustic wave (SAW) devices, and also function as anti-aliasing filters (AAF) for subsequent digitization. A SAW filter is preferable in this situation because of its linear phase characteristics (very low signal degradation) and very narrow transition region. The narrow transition region allows a minimum sampling rate to be used, thus reducing the required digital processing. Before analog-to-digital conversion is performed, an anti-aliasing filtering operation is carried out to prevent out-of-band energy from being folded into the band of interest and thus interfering with the signal of interest. This is done so that the digitization can be performed either at an intermediate frequency, or baseband.

After passing the extracted or segmented sub-band through the bandpass filters 28, the sub-band is downconverted to baseband using a mixer 26 and fixed local oscillator 14, and passed through the image rejection filter (IRF) 18. The baseband sub-band signal is then converted to digital and processed by a digital processor 20, which may perform demodulation and digital switching of the baseband signals.

Although FIG. 2 shows a real downconversion to baseband, the repeater could alternatively employ a complex (I/Q) decomposition and downconversion. In addition, although downconversion to baseband is shown, alternatively, downconversion to an intermediate frequency by mixer 16 could be carried out followed by an intermediate frequency analog-to-digital conversion.

Having described the elemental connections of the present invention it is illustrative to consider several examples of how the analog pre-processor can be used to manage and optimize the risk of choosing a particular digital processor technology. Assume a hypothetical 8-beam digital satellite having at least one antenna with a plurality of receive elements 10 for receiving the uplink beams. Each beam may include up to 125 MHz of information spread over a number of carriers. In addition, assume that based on traffic studies performed for this satellite, 2 of the uplink beams will be completely utilized (125 MHz), 2 of the beams will be only partially utilized (75 MHz typically), and the remaining 4 beams will be generally underutilized (25 MHz average). Thus the total average bandwidth that needs to be processed is 500 MHz (2×125+2×75+4×25=500 MHz).

Using the one-to-one architecture of FIG. 1, each digital processor must be capable of processing 125 MHz of bandwidth in order to provide flexibility for changing traffic patterns, resulting in a total processing capability of 1 GHz (8 processors×125 MHz=1 GHz). Thus, half of the processing capability of the satellite is wasted. In addition, the satellite design would be fairly risky since space-qualified digital processors capable of operating on this bandwidth are not readily available.

In addition to wasted digital processing, redundancy is difficult and costly to implement with this prior art design. A standard 2:1 redundancy scheme would require a doubling of the hardware in order to provide a redundant path for each processor. This would be very costly in terms of space, power, and mass, and would thus drive up the cost of the satellite.

However, using the analog pre-processor for digital satellites disclosed in FIG. 2, an architecture can be provided which optimizes the selection of digital hardware and thereby manages the risk of using a particular technology. Assuming the same situation as above, the level of risk viewed as acceptable is determined, and the hardware is accordingly selected. For example, assuming a minimum risk design, 25 MHz low-power, space-qualified digital processors are utilized. Knowing that the typical overall satellite bandwidth to be processed is 500 MHz, at least 20 sub-band processing chains and associated digital processors are selected. To be on the safe side, several additional chains are added in order to deal with additional traffic, or with a potentially expanding traffic pattern. In this manner, the design is selected to match the level of risk deemed acceptable.

In operation, the N×M switching matrix 22 is configured to route the incoming beams to the appropriate number of sub-band processing chains. The two fully utilized beams (125 MHz) are routed to five sub-band processing chains, each connected to a 25 MHz digital processor 20. The partially utilized beams (75 Mhz) are routed to three sub-band processing chains, and the underutilized beams (25 MHz) are routed to one sub-band processing chain. This connectivity can be changed over the lifetime of the satellite as general traffic patterns change, or even on an hourly basis for daily traffic fluctuations, e.g. during business hours.

Each sub-band that contains carriers of interest is then extracted or segmented from the total bandwidth of the uplink beam by selecting the frequency of the variable local oscillator 26 to bring the sub-band within the passband of the BPF 28. In this example, the passband of the BPFs is at least 25 MHz in order to accommodate the maximum sub-band, but as stated above, could be designed to be narrower in order to provide finer granularity for certain underutilized beams. In this manner the total digital processing power of the satellite is matched or optimized based on the incoming traffic pattern of the uplink beams. In addition, as the traffic pattern changes, the satellite can be re-optimized by reconfiguring the N×M switch matrix 22 and re-selecting the translation frequency of the VLOs 26.

Alternatively, a higher risk design may be acceptable, using digital processors capable of processing a larger bandwidth than 25 MHz, such as 75 MHz processors. Assuming again a 500 MHz total traffic pattern as described above and 75 MHz digital processors, the design of the analog pre-processor is again optimized by matching the processing capability to the projected traffic pattern.

Using the example traffic pattern from above, the two fully utilized beams (125 MHz) are each routed to two sub-band processing chains and two 75 MHz processors, the partially utilized beams (75 Mhz) are routed to one sub-band processing chain, and the underutilized beams are each routed to one sub-band processing chain. In this configuration, a minimum of 11 sub-band processing chains are required, but again additional chains could be added to accommodate expanding or changing traffic patterns. In addition, the passband of the BPFs 28 are increased to accommodate the maximum 75 MHz sub-band, the N×M switch matrix 22 is configured to appropriately route the incoming uplink signals to the sub-band processing chains, and the selectable VLOs 26 are programmed to extract the appropriate segments or sub-bands of the overall uplink beam bandwidth.

In a similar manner to the two examples above, given any particular bandwidth to process digitally, the analog pre-processor is used to optimize the amount of digital hardware required. Thus the analog pre-processor provides for a programmable optimized design that can be re-optimized based on changing traffic patterns, and which can flexibly accommodate various redundancy schemes with minimal hardware impact.

A satellite using the present invention includes the added advantage of being able to support any type of redundancy scheme by simply adding sub-band processing chains. For example, in the hypothetical system above where 20 sub-band processing chains are used, a conventional 2:1 redundancy scheme can be designed by adding an additional 20 sub-band processing chains. However, it is desirable to use other, non-conventional redundancy schemes, such as 10:8 or 12:8 as these schemes minimize the total amount of additional hardware to achieve a given level of redundancy. The present invention facilitates these types of redundancy schemes by adding sub-band processing chains and configuring the switch matrix. Since the switch matrix 22 can switch any beam to any sub-band chain, a failure of any sub-band processing chain or any digital processor can be overcome by rerouting that beam to one of the redundant chains. Thus a high level of reliability can be achieved while minimizing the increase in hardware.

Figure 3:
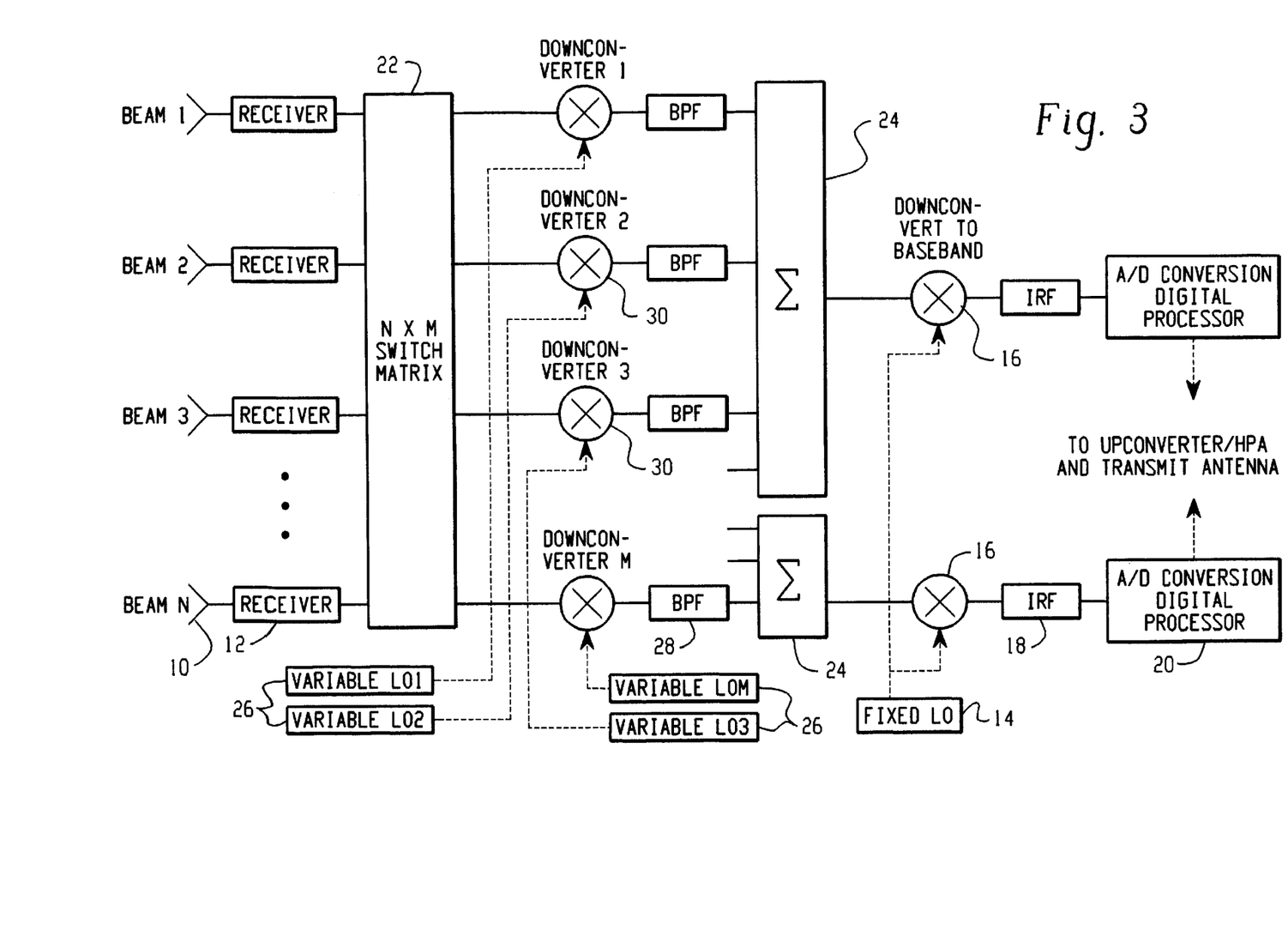
FIG. 3 is a block diagram of an alternative digital repeater incorporating the analog pre-processor of the present invention and also including N-to-one correspondence between portions of incoming RF beams and digital processors.

Turning now to FIG. 3, an alternative embodiment of the present invention is set forth. The satellite repeater of FIG. 3 is identical to that of FIG. 2, except that after the sub-band processing chains but before the downconversion to baseband circuitry, a summer or combiner circuit 24 is used to combine the sub-bands from several sub-band processing chains. This architecture uses higher-risk digital processing technology, but retains the advantages of the present invention in being able to optimize the processing power to a potentially changing traffic pattern, and also retains the advantages of flexibility, programmability, and redundancy.

The only change needed to operate the digital repeater of FIG. 3 is that the bandpass filters BPFs 28 must have adjacent and non-overlapping center frequencies and bandwidths so that when combined the bandwidth out of the summer 24 is equal to the sum of the bandwidths of the individual BPFs 28. Applying the hypothetical example above which included 8 uplink beams and a 500 MHz average bandwidth requirement, the system of FIG. 3 can be optimized to segment, route, combine and process the uplink signals.

For example, assume the selection of higher-risk 125 MHz digital processors. At least four processors will be required to process the average 500 MHz bandwidth, although in a real design an additional 125 MHz processor would likely be added to handle increases in traffic flow, and another processor or two could be added for redundancy purposes. By distinction, and further establishing the advantages of the present invention, the prior art digital repeater would require at least 8 125 MHz digital processors, plus additional 125 MHz processors if a redundancy scheme is implemented.

Assuming the selection of 25 MHz bandpass filters 28, five sub-band processing chains will feed each summer circuit 24, for a total of 20 sub-band processing chains. Each bandpass filter 28 in a group of five will have a different center frequency and may have different bandwidths, although for this example the assumption is that all BPFs have a 25 MHz passband. The combination of the five sub-band extracted signals is combined by the summer 24 and subsequently downconverted to baseband for digital processing.

Using the alternative architecture of FIG. 3, the processing power of the satellite can be optimized for a higher-risk digital processing technology, while maintaining the granularity of a lower-risk processor system. The system of FIG. 3 digitally processes 125 MHz combined sub-bands, but has the ability to switch, segment and route much smaller 25 MHz subbands. Such a combination of functionality is not possible with prior art digital satellite repeaters.

Having described in detail the preferred embodiments of the present invention, it is to be understood that the invention could be carried out with circuitry different than the circuitry specifically described in the examples given herein. In addition, the particular component values and circuit elements making up the invention can be readily determined by those of ordinary skill in the art based on the present disclosure. These preferred embodiments are presented only by way of example in order to teach the best mode the inventors know for carrying out the invention and are not meant to limit the scope of the present invention which is defined by the following claims.

What is claimed:

1. An analog preprocessor for use with a digital satellite having at least one receive antenna for receiving a plurality of uplink beams and a plurality of digital processors for processing information in the uplink beams, the analog pre-processor comprising:

a switch matrix coupled to the plurality of uplink beams for switching the uplink beams to one or more outputs of the switch matrix; and a plurality of sub-band processing chains coupled between the outputs of the switch matrix and the plurality of digital processors, each sub-band processing chain comprising:

a mixer having at least two inputs and at least one output, one of the inputs of the mixer coupled to one of the outputs of the switch matrix, and thus one of the uplink beams;

a variable local oscillator coupled to the other input of the mixer; and a bandpass filter coupled to the output of the mixer, wherein the variable local oscillator generates a translation frequency that causes the mixer to translate a sub-band of information from the uplink beam to an extraction frequency for filtering by the bandpass filter, the sub-band of information comprising a plurality of carrier signals having a bandwidth that is less than the bandwidth of the uplink beam.

2. The analog pre-processor of claim 1, wherein the translation frequency is selectable.

3. The analog pre-processor of claim 1, wherein the bandpass filter is a surface-acoustic wave device.

4. The analog pre-processor of claim 1, wherein the sub-band processing chains further include a downconverter coupled to the bandpass filter that converts the filtered sub-band of information to a baseband signal.

5. The analog pre-processor of claim 4, wherein the downconverter performs a real downconversion.

6. The analog pre-processor of claim 4, wherein the downconverter performs a complex downconversion.

7. The analog pre-processor of claim 1, wherein the switch matrix and sub-band processing chains can be reconfigured to accommodate changing traffic patterns of the uplink beams.

8. The analog pre-processor of claim 1, wherein the at least one receive antenna is a multi-beam antenna having a plurality of receive elements, and wherein the uplink beams are formed from the individual receive elements of the multi-beam antenna.

9. The analog pre-processor of claim 1, wherein the at least one receive antenna is a multi-beam antenna having an analog beamformer, and wherein the uplink beams are formed from the outputs of the analog beam former.

10. The analog pre-processor of claim 1, wherein the at least one antenna is a phased array antenna having an analog beamformer and wherein the uplink beams are formed from the outputs of the analog beamformer of the phased array antenna.

11. The analog pre-processor of claim 1, further including at least one summer circuit coupled between one or more of the plurality of sub-band processing chains and at least one of the digital processors, wherein the at least one summer circuit combines the filtered sub-bands of information from the one or more sub-band processing chains prior to digital processing.

12. A digital satellite repeater comprising:

at least one antenna having a plurality of receive elements for receiving uplink RF beams;

a switching matrix connected to the plurality of receive elements for switching the uplink RF beams to a plurality of switched outputs;

a plurality of sub-band processing chains connected to the plurality of switched outputs for extracting a plurality of carrier signals from the uplink RF beams, each sub-band processing chain including a mixer; a variable local oscillator; and a bandpass extraction filter coupled to the mixer, wherein the variable local oscillator generates a selectable frequency translation signal coupled to the mixer that translates the frequency of the switched uplink beam so that the plurality of carrier signals to be extracted is brought within the pass band of the bandpass extraction filter; and a plurality of digital processors coupled to the sub-band processing chains for digitizing and processing the extracted carrier signals of the uplink RF beams.

13. The digital satellite repeater of claim 12, wherein the sub-band processing chains include a downconverter for converting the extracted portion of the uplink beam to a baseband signal.

14. The digital satellite repeater of claim 12, wherein the switching matrix and sub-band processing chains can be reconfigured.

15. A digital satellite having receive elements for receiving uplink RF signals and a plurality of digital processors for processing the uplink REP signals, the digital satellite including:

means for switching the received uplink RF signals; and means for extracting sub-bands of bandwidth from the switched uplink RF signals, and for routing the sub-bands to the plurality of digital processors, each sub-band including a plurality of carrier signals, the means for extracting sub-bands of information including:

means for generating a selectable frequency translation signal;

means for translating the frequency of the switched RF uplink signal using the selectable frequency translation signal; and means for filtering a sub-band of bandwidth from the translated switched RF uplink signal.

16. The digital satellite of claim 15, wherein the means for translating includes a mixer.

17. The digital satellite of claim 15, wherein the means for filtering is a bandpass filter.

18. The digital satellite of claim 15, further including means for downconverting the filtered sub-band of information to a baseband signal prior to digital processing.

19. The digital satellite repeater of claim 18, wherein the means for downconverting is a real downconverter.

20. The digital satellite repeater of claim 18, wherein the means for downconverting is a complex downconverter.

21. A method of processing uplink beams in a digital communication satellite having at least one antenna with a plurality of receive elements for receiving the uplink beams, the method comprising the steps of:

(a) switching the received beams;

(b) segmenting at least one sub-band from each of the received uplink beams by (i) generating a selectable frequency translation signal; (ii) translating the frequency of the uplink beam to form a translated signal using the selectable frequency translation signal; and (iii) bandpass filtering the translated signal to form a segmented sub-band; and (c) routing the segmented sub-bands to a plurality of digital processors that digitally process the sub-bands.

22. The method of claim 21, further including the step of:

(d) downconverting the segmented sub-bands prior to digital processing.

23. Satellite apparatus, comprising:

a plurality of receivers for receiving uplink beams of digital information, the plurality of receivers organized into a plurality of groups;

a plurality of digital processors for processing the digital information in the uplink beams; and a plurality of analog pre-processors coupled between the plurality of groups of receivers and the plurality of digital processors, each analog pre-processor comprising: a switch matrix for switching the uplink beams to one or more of the plurality of digital processors; and a plurality of sub-band processing circuits for extracting a portion of the bandwidth of the switched uplink beam and for routing the extracted portion to one of the digital processors, wherein the portion of bandwidth extracted comprises a plurality of carriers of digital information.

24. The satellite apparatus of claim 23, wherein the sub-band processing circuits further comprise: a downconverter coupled to a switched uplink beam; a variable local oscillator coupled to a frequency conversion input of the downconverter; and a bandpass extraction filter coupled to an output of the downconverter; wherein the variable local oscillator generates a selectable frequency translation signal that translates the frequency of the switched uplink beam so that the portion of bandwidth to be extracted is brought within the pass band of the bandpass extraction filter.

25. The satellite apparatus of claim 24, wherein the selectable frequency translation signal is programmable over the bandwidth of an uplink beam, so that any portion of the bandwidth of the uplink beam can be extracted by the sub-band processing circuit.

26. Multi-beam satellite apparatus, comprising:

a plurality of receivers, each receiver coupled to an antenna element for receiving an uplink beam of digital information;

an N×M uplink beam switch matrix coupled to the plurality of receivers for switching N of the uplink beams to one or more of M outputs of the uplink beam switch matrix;

at least M sub-band extraction circuits coupled to the M outputs of the uplink beam switch matrix, each sub-band extraction circuit including a selectable local oscillator for generating a frequency translation signal, a mixer coupled to one of the M outputs and to the frequency translation signal, and a bandpass extraction filter coupled to the output of the mixer, wherein the frequency translation signal causes the mixer to translate a sub-band of carrier signals from the uplink beam to an extraction frequency that is within the passband of the bandpass extraction filter; and a plurality of digital processors coupled to the M sub-band extraction circuits for processing the carrier signals in each of the extracted sub-bands.

27. The multi-beam satellite apparatus of claim 26, further comprising:

a plurality of combiner circuits coupled between the sub-band extraction circuits and the plurality of digital processors, each combiner having a plurality of inputs coupled to a plurality of sub-band extraction circuits, and at least one output coupled to a digital processor, wherein the combiner circuit combines the extracted sub-bands of digital information from the plurality of sub-band extraction circuits prior to digital processing.

28. The multi-beam satellite apparatus of claim 27, wherein the bandpass extraction filters in each sub-band extraction circuit that are coupled to one of the combiners are characterized by adjacent and non-overlapping passbands.

29. A regenerative multi-beam digital satellite, comprising:

a plurality of receivers (12) for receiving a plurality of uplink beams (10), each uplink beam carry up to X MHZ of digital information;

a plurality of digital processors (20) for processing the X MHZ of digital information in the uplink beams (10), each digital processor (20) having the ability to process Y MHZ of information, wherein Y is less than X; and an analog bandwidth allocation processor coupled between the plurality of receivers (12) and the plurality of digital processors (20) for dynamically allocating one or more of the digital processors (20) to the plurality of uplink beams (10), the analog bandwidth allocation processor comprising:

an N×M switch matrix (22) having N inputs and M outputs for switching the uplink beams, wherein the N inputs of the switch matrix (22) are coupled to N of the uplink beams, and a plurality of sub-band processing chains coupled between the M outputs of the N×M switch matrix (22) and the plurality of digital processors (20), each sub-band processing chain including:

- a downconverter (30) coupled to one of the M outputs of the N×M switch matrix (22), each of the M outputs corresponding to an uplink beam (10);
- a variable local oscillator (26) coupled to the downconverter (30) for generating a selectable translation frequency that causes the downconverter to translate a sub-band of the bandwidth of the uplink beam (10) to an extraction frequency; and
- a bandpass extraction filter (28) for extracting the translated sub-band from the uplink beam (10) and for routing this extracted sub-band to one or more of the digital processors (20).

* * * * *

UNITED STATES PATENT AND TRADEMARK OFFICE
CERTIFICATE OF CORRECTION

PATENT NO. : 5,956,620
DATED : September 21, 1999
INVENTOR(S) : Ken Lazaris-Brunner; Gary Beauchamp; Bharat Tailor It is certified that error appears in the above-indentified patent and that said Letters Patent is hereby corrected as shown below:

Claim 15 (Col. 10, line 66):  Delete "REP" and insert -- RF --.

Signed and Sealed this

Twenty-ninth Day of February, 2000

Attest:

Q. TODD DICKINSON

Attesting Officer

Commissioner of Patents and Trademarks